United States Patent
Minihane et al.

[11] Patent Number: 6,068,165
[45] Date of Patent: May 30, 2000

[54] PREMEASURED DISPENSING BOTTLE CAP

[76] Inventors: Denis A. Minihane; Martin Haverty, both of 103 Chestnut St., 2nd Floor, North Arlington, N.J. 07031

[21] Appl. No.: 09/310,729

[22] Filed: May 13, 1999

Related U.S. Application Data

[60] Provisional application No. 60/098,887, Sep. 2, 1998.
[51] Int. Cl.[7] ........................................ B67D 3/18
[52] U.S. Cl. ...................... 222/454; 222/425; 222/448
[58] Field of Search .............................. 222/454, 424.5, 222/425, 444, 448, 188

[56] References Cited

U.S. PATENT DOCUMENTS 3,894,661  7/1975  Guala ........................................ 222/188
4,886,193  12/1989  Wassilieff ................................ 222/446

Primary Examiner—Steven O. Douglas
Attorney, Agent, or Firm—Richard C. Litman

[57] ABSTRACT

A premeasured dispensing bottle cap consists of an inner sleeve and an outer sleeve. The inner sleeve is adapted for engaging the neck of a bottle. The walls of the inner sleeve define a measuring chamber which holds a premeasured volume of liquid. The outer sleeve has a dispensing outlet with a hinged lid. The inner sleeve and the outer sleeve have ports for the flow of fluid from the bottle to the inner sleeve, and from the inner sleeve to the outer sleeve and dispensing outlet with the bottle in an inverted position. The flow is such that with the outer sleeve in a fill position, liquid flows from the bottle to fill the measuring chamber in the inner sleeve, but not into the outer sleeve, and with the outer sleeve in a dispensing position, liquid flows from the measuring chamber through the outer sleeve and dispensing outlet, but not from the bottle to the inner sleeve.

In some embodiments the flow of liquid is controlled by a valve moved by sliding the outer sleeve along the longitudinal axis of the inner sleeve, and in other embodiments through the alignment of partitions in the inner and outer sleeves by rotating the outer sleeve about the longitudinal axis of the inner sleeve.

5 Claims, 12 Drawing Sheets

PREMEASURED DISPENSING BOTTLE CAP

CROSS-REFERENCE TO RELATED APPLICATION

This application claims the benefit of U.S. Provisional Patent Application Ser. No. 60/098,887, filed Sep. 2, 1998.

BACKGROUND OF THE INVENTION

1. Field of the Invention

The present invention relates to measuring caps and dispenser caps for bottles and similar containers, and particularly to a bottle cap which dispenses premeasured amounts of liquids such as detergents and other fluids.

2. Description of Related Art

Many products for use in the household come in liquid form, such as detergents for laundry, dishwashers, etc. The directions for use of the product frequently call for a measured quantity of the fluid. The busy homeowner usually does not have a separate measuring cup set aside for each such application. A better solution is to incorporate a measuring dispenser on the product container. Several devices have been developed to accomplish this purpose.

Numerous devices have been developed which utilize a moveable valve or piston. U.S. Pat. No. 4,285,074, issued Aug. 25, 1981 to W. S. Leinberry, describes a device for dispensing premeasured quantities of a concentrate in a toilet tank which features two valves tapered in opposite directions mounted on a stem which moves in response to the buoyancy of a float to alternately seat and unseat the valves. Two patents issued to M. S. Cater, U.S. Pat. No. 5,147,073, issued Sep. 15, 1992, and U.S. Pat. No. 5,217,148, issued Jun. 8, 1993, teach a dispenser utilizing a moveable piston and two chambers to ensure an accurate premeasured dosage after prolonged storage.

A third patent to Cater, U.S. Pat. No. 5,083,682, issued Jan. 28, 1992, describes a fluid atomizer, but does not mention premeasured quantities. Yet a fourth patent to Cater, U.S. Pat. No. 5,279,568, issued Jan. 18, 1994, discloses a pump with two moveable pistons and upper and lower chambers designed for fluid mixtures and suspensions, using grooves on the pistons to help mix the fluids and particulate matter.

U.S. Pat. No. 5,169,038, issued Dec. 8, 1992 to P. DiGiovanni, teaches a metering valve for a can where the liquid is ejected when the can is inverted having a valve with a push rod biased in the rest position by a spring. U.S. Pat. No. 2,530,012, issued Nov. 14, 1950, shows a spring biased valve above the mouth of the bottle which is pressed down and inverted to fill a measuring cup and set upright to pour the liquid from the cup.

U.S. Pat. No. 4,807,785, issued Feb. 28, 1989 to E. J. Pritchett, shows a cap with a valve moveable in a tube between three positions, the tube including a handle. U.S. Pat. No. 5,186,367, issued Feb. 16, 1993, shows a moveable valve and piston operated by squeezing the bottle. U.S. Pat. No. 1,326,253, issued Dec. 30, 1919 to Cordley, et al., teaches a bottle with a rotary valve controlling flow to a measuring chamber. U.S. Pat. No. 4,153,187, issued May 8, 1979 to J. D. Marrington, describes a valve moved between two seats by a trigger.

A number of bottle caps for dispensing premeasured amounts of liquid have been designed which use stationary partition walls of various geometric design and arrangement to control fluid flow. U.S. Pat. No. 5,029,736, issued Jul. 9, 1991 to Maruyama, et al., teaches a cap with two chambers having inlet and outlet passages separated by angled partition walls. U.S. Pat. No. 2,760,692, issued Aug. 28, 1956 to W. W. Buehlig, shows a dispensing cap with partition walls describing an S-shaped fluid passage having measuring and dispensing chambers defined therein.

U.S. Pat. No. 5,011,048, issued Apr. 30, 1991 to A. D. Mack describes a cap cover with a cylindrical tube defining a measuring cup depending from the cover and a conically shaped cap with a spout, the cup being filled by inverting the bottle and the liquid being poured through a hinged lid in the cover. U.S. Pat. No. 2,760,693, issued Aug. 6, 1954 to S. E. Mika, shows a cylindrical bottle insert having a circular flange extending over the lip of the bottle, the insert having a hole with a hinged cover in its side to regulate the flow of fluid.

In some devices, the cap itself is a measuring cup which is removed from the bottle so that the liquid may be poured into the cap and measured by sight. U.S. Pat. No. 4,349,056, issued Sep. 14, 1982 to J. Heino describes a cap, a container with a neck, and an insert, in which the liquid is measured by pouring into the cap and in which dripping of the fluid on the outside of the container is inhibited by the skirt of the cap scraping against the insert when the cap is inserted over the neck of the container. U.S. Pat. No. 4,416,381, issued Nov. 22, 1983 to E. W. Swartout shows a cap for a bottle with tapered and graduated sidewalls and an integral stopper having various structures.

The present invention concerns a cap used to dispense premeasured amounts of liquid from a bottle. The cap has an inner sleeve and an outer sleeve. Various embodiments are present, of which some have a moveable valve, and some have a series of partitions whose alignments are altered by rotating the outer sleeve. The cap may be made economically from thermoplastic materials.

None of the above inventions and patents, taken either singly or in combination, is seen to describe the instant invention as claimed.

SUMMARY OF THE INVENTION

The premeasured dispensing bottle cap consists of an inner sleeve and an outer sleeve. The inner sleeve is adapted for engaging the neck of a bottle. The walls of the inner sleeve define a measuring chamber which holds a premeasured volume of liquid. The outer sleeve has a dispensing outlet with a hinged lid. The inner sleeve and the outer sleeve have ports for the flow of fluid from the bottle to the inner sleeve, and from the inner sleeve to the outer sleeve and the dispensing outlet with the bottle in an inverted position. The flow is such that with the outer sleeve in a fill position, liquid flows from the bottle to fill the measuring chamber in the inner sleeve, but not into the outer sleeve; moreover, with the outer sleeve in a dispensing position, liquid flows from the measuring chamber through the outer sleeve and dispensing outlet, but not from the bottle to the inner sleeve. In some embodiments the flow of liquid is controlled by a valve moved by sliding the outer sleeve along the longitudinal axis of the inner sleeve, and in other embodiments through the alignment of partitions in the inner and outer sleeves by rotating the outer sleeve about the longitudinal axis of the inner sleeve.

Accordingly, it is a principal object of the invention to provide a bottle cap for dispensing premeasured quantities of liquid which may be operated by simply sliding an outer sleeve frictionally engaging an inner sleeve with the bottle in an inverted position.

It is another object of the invention to provide a bottle cap for dispensing premeasured quantities of liquid which may be operated by simply rotating an outer sleeve in rotatable engagement with an inner sleeve with the bottle in an inverted position.

It is a further object of the invention to provide a bottle cap for dispensing premeasured quantities of liquid which may be economically fabricated from thermoplastic materials.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
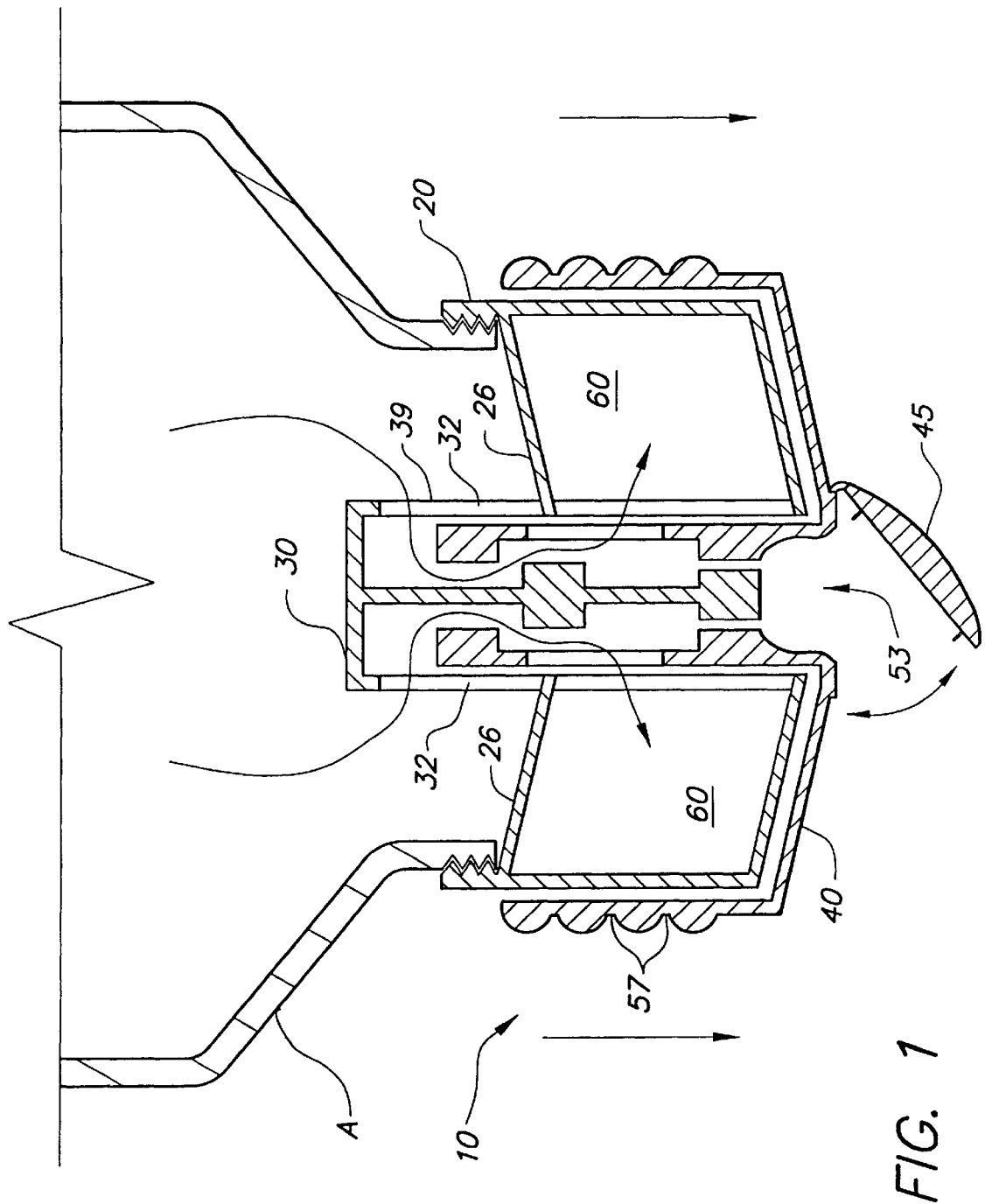
FIG. 1 is a cross sectional view in a vertical plane passing through the longitudinal axis of a first embodiment of a premeasured dispensing bottle cap according to the present invention showing the cap in a fill position.
Figure 2:
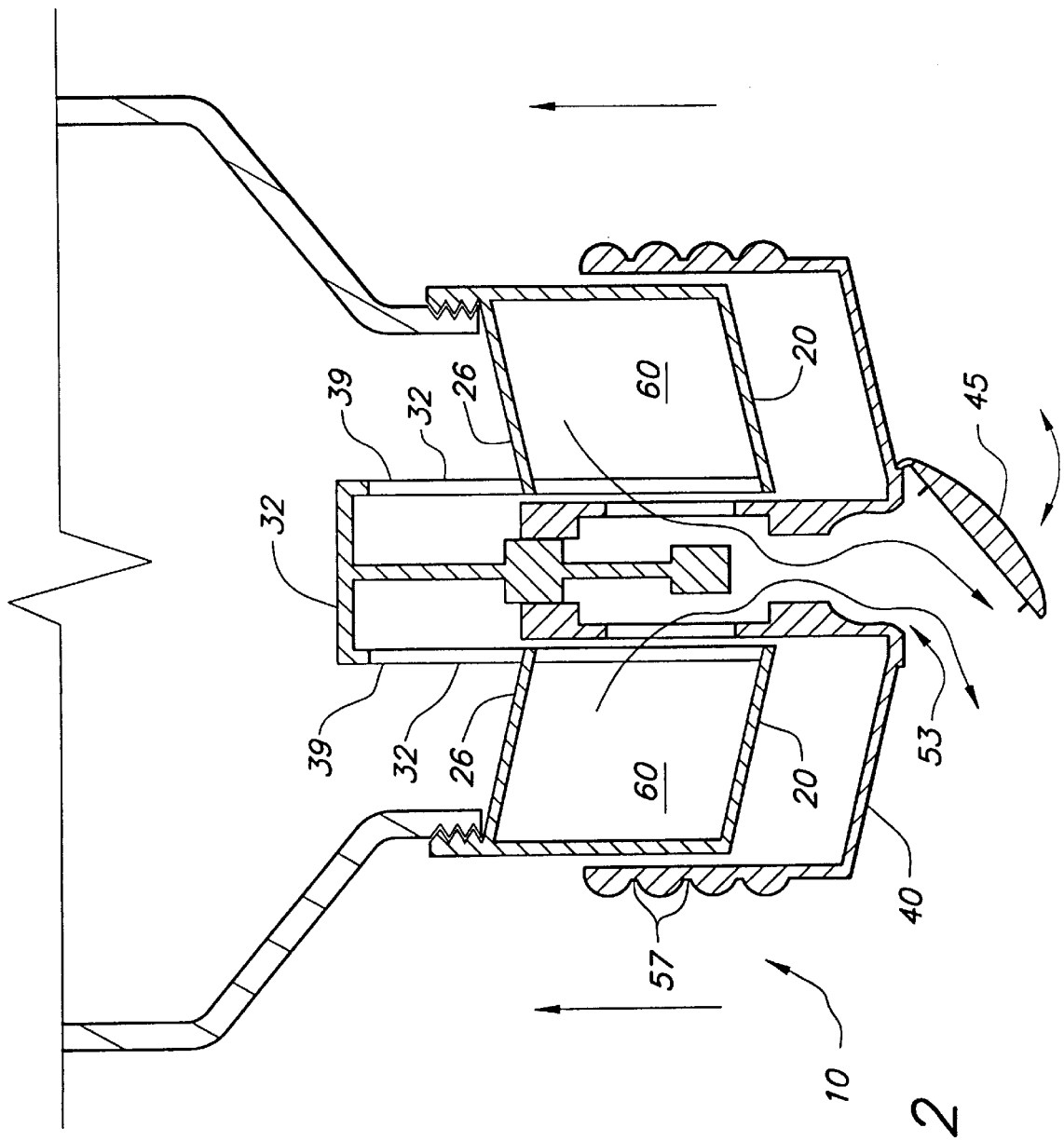
FIG. 2 is a cross sectional view in a vertical plane passing through the longitudinal axis of the premeasured dispensing bottle cap of FIG. 1 showing the cap in a dispensing position.
Figure 3:
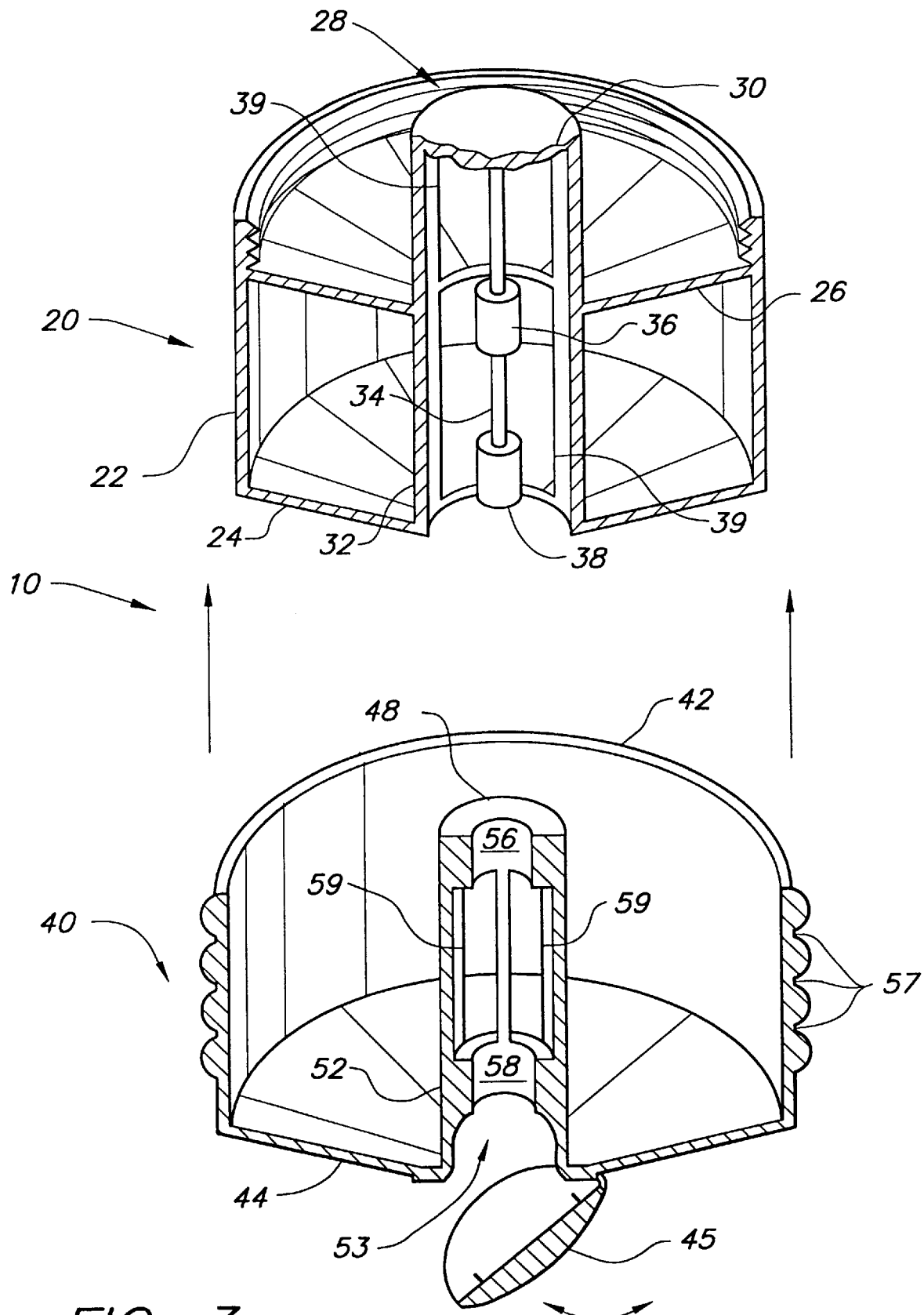
FIG. 3 is an exploded view of the premeasured dispensing bottle cap of FIG. 1 showing the outer sleeve and the inner sleeve.

The present invention is a premeasured dispensing bottle cap for dispensing a measured volume of liquid from a bottle. A first embodiment of the bottle cap 10 is shown in FIGS. 1 through 3. As shown in FIG. 3, the cap includes an inner sleeve 20 and an outer sleeve 40. The inner sleeve 20 has an outer wall 22 which is generally cylindrical in shape, the cylinder being hollow and open at one end. The inner sleeve 20 includes a base wall 24 at the base of the outer wall 22, and an interior wall 26, the base wall 24 and the interior wall 26 being substantially perpendicular to the longitudinal axis of the inner sleeve 20, having a slight taper downwards to allow for easy flow of liquid.

The inner sleeve 20 includes a center tube 28, having a top wall 30 and a skirt 32. The center tube 28 is hollow and generally cylindrical in shape, coaxial with the inner sleeve 20, and open at the bottom, the skirt 32 defining a circular opening in the base wall 24 of the inner sleeve 20. The center tube 28 has a height greater than the height of the outer wall 22 and extends through the interior wall 26. A rod 34 depends from the top wall 30, the rod 34 being on the longitudinal axis of the inner sleeve 20. The rod 34 includes a top valve 36 and a bottom valve 38 disposed spaced apart and disposed about its circumference.

The portion of the outer wall 22 disposed between the interior wall 26 and the open end of the inner sleeve 20 is adapted for connection to the neck or mouth of a bottle A, as shown in FIGS. 1 and 2. The skirt 32 has a plurality of ports 39 for the passage of fluid defined therein, both above and below the level of the interior wall 26.

The outer sleeve 40 has an outer wall 42 which is generally cylindrical in shape, the cylinder being hollow and open at one end. The inside diameter of the outer wall 42 of the outer sleeve 40 is slightly greater than the outside diameter of the outer wall 22 of the inner sleeve 20, so that the outer sleeve 40 may frictionally engage the inner sleeve 20 in slidable relation. The outer sleeve 40 includes a base wall 44 at the base of the outer wall 42 substantially perpendicular to the longitudinal axis of the outer sleeve 40.

The outer sleeve 40 includes a center tube 48, having a skirt 52. The center tube 48 is hollow and generally cylindrical in shape, coaxial with the outer sleeve 40, and open at the bottom, the skirt 52 defining a circular dispenser opening or outlet 53 in the base wall 44 of the outer sleeve 40. The center tube 48 has a height greater than the height of the outer wall 44 so that the center tube 48 extends into the neck of the bottle A. A pair of flanges having bores defined therein project inwardly from the skirt 52 defining a top valve seat 56 and a bottom valve seat 58 spaced apart and disposed coaxially with the center tube 48. The skirt 52 includes a plurality of ports 59 defined therein for the passage of liquid. The base wall 44 has a cover 45 hingedly attached thereto aligned with the dispensing outlet 53 in order to prevent the dispensing of liquid from the bottle A when the cover 45 is in the closed position. The outer sleeve 40 also may have some form of gripping means on its outside surface, such as a plurality of grooves 57 defined therein either horizontally or vertically, to provide a surface which is easier to grasp when sliding the sleeve 40.

In operation, the outer sleeve 40 is in sliding relation with the inner sleeve 20, having a dispensing position with the outer sleeve 40 extended, and a fill position with the outer sleeve 40 retracted. In the fill position, the outer wall 22, base wall 24, and interior wall 26 of the inner sleeve 20 define a measuring chamber 60. The bottom valve 38 frictionally engages the bottom valve seat 58 to seal the bottom of the chamber 60, while the top valve 36 is open, permitting the flow of liquid from the bottle A through the ports 39 in the center tube 28 of the inner sleeve 20 and the ports 59 in the center tube 48 of the outer sleeve, filling the measuring chamber 60 with a predetermined volume of liquid with the bottle A inverted, as shown in FIG. 1.

The outer sleeve may then be extended to the dispensing position, as shown in FIG. 2. In the dispensing position, the upper valve 36 engages the upper valve seat 56, sealing the top of the measuring chamber 60, preventing the further flow of liquid from the bottle A to the chamber 60. The bottom valve 38 is open, permitting the flow of liquid by gravity with the bottle inverted from the measuring chamber 60 through the ports 39 and 59 defined in the inner sleeve 20 and the outer sleeve 40, exiting the cap 10 through the dispensing outlet 53, the hinged cover 45 being open.

It will be apparent that in this embodiment the valves 36 and 38 are stationary, and it is the valve seats 56 and 58 which move to open and close the valves. It is believed that this structure is unique as applied to premeasured dispensing bottle caps. It will also be apparent to those skilled in the art that several obvious variations and improvements may be made in the first embodiment of the present invention. For example, the valves 36 and 38 and valve seats 56 and 58 may be tapered, the tapers extending in opposite directions, or a circular flange may be added to the outer circumference of the valves 36 and 38, with or without matching grooves in the valve seats 56 and 58, in order to form lapped valves, or a flange may be added to the outer surface of the inner sleeve 20 and a lip to the inside surface of the outer sleeve 40 in order to ensure that the outer sleeve 40 is not accidentally removed when extending the outer sleeve 40.

Figure 4:
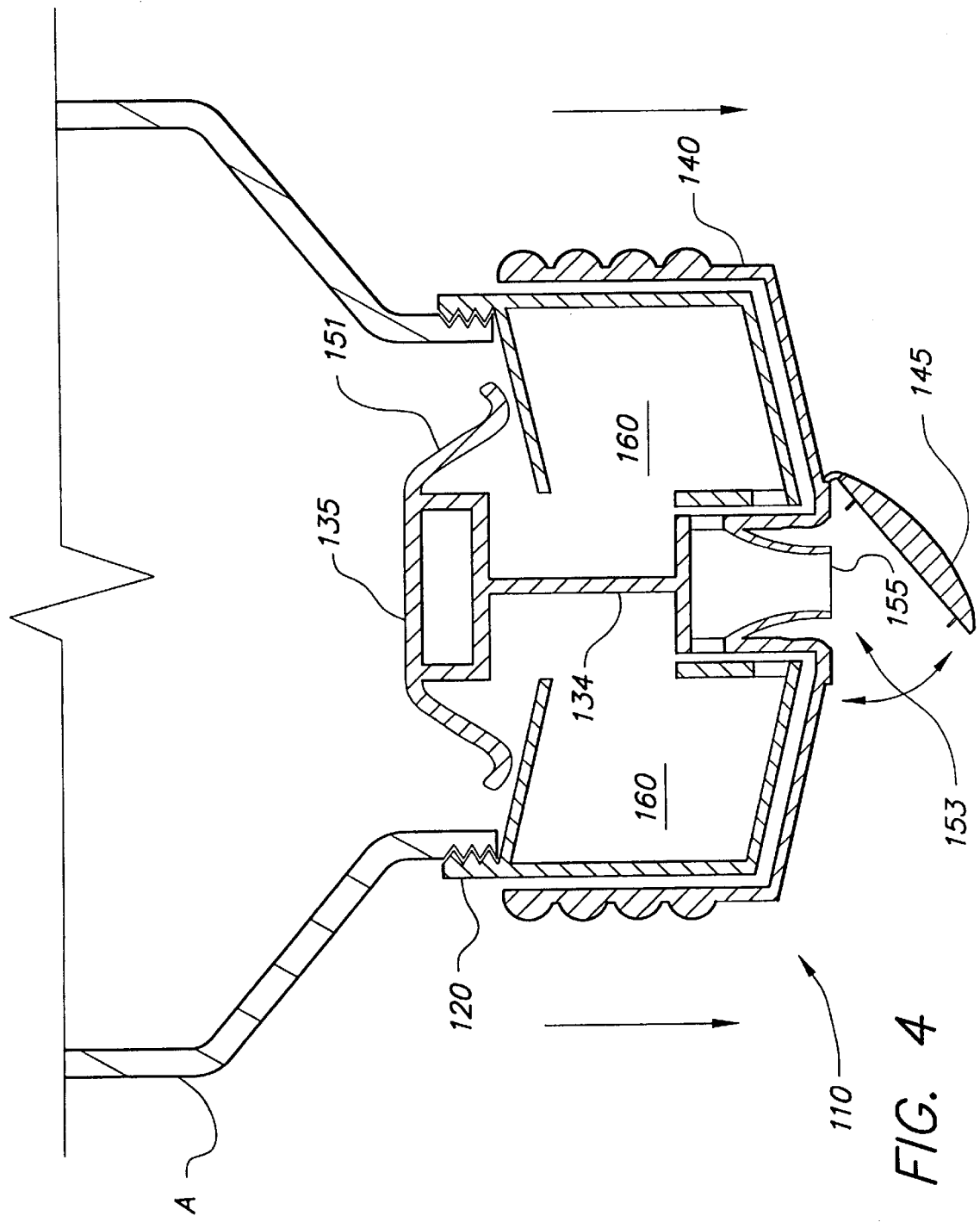
FIG. 4 is a cross sectional view in a vertical plane passing through the longitudinal axis of a second embodiment of a premeasured dispensing bottle cap according to the present invention showing the cap in a fill position.
Figure 5:
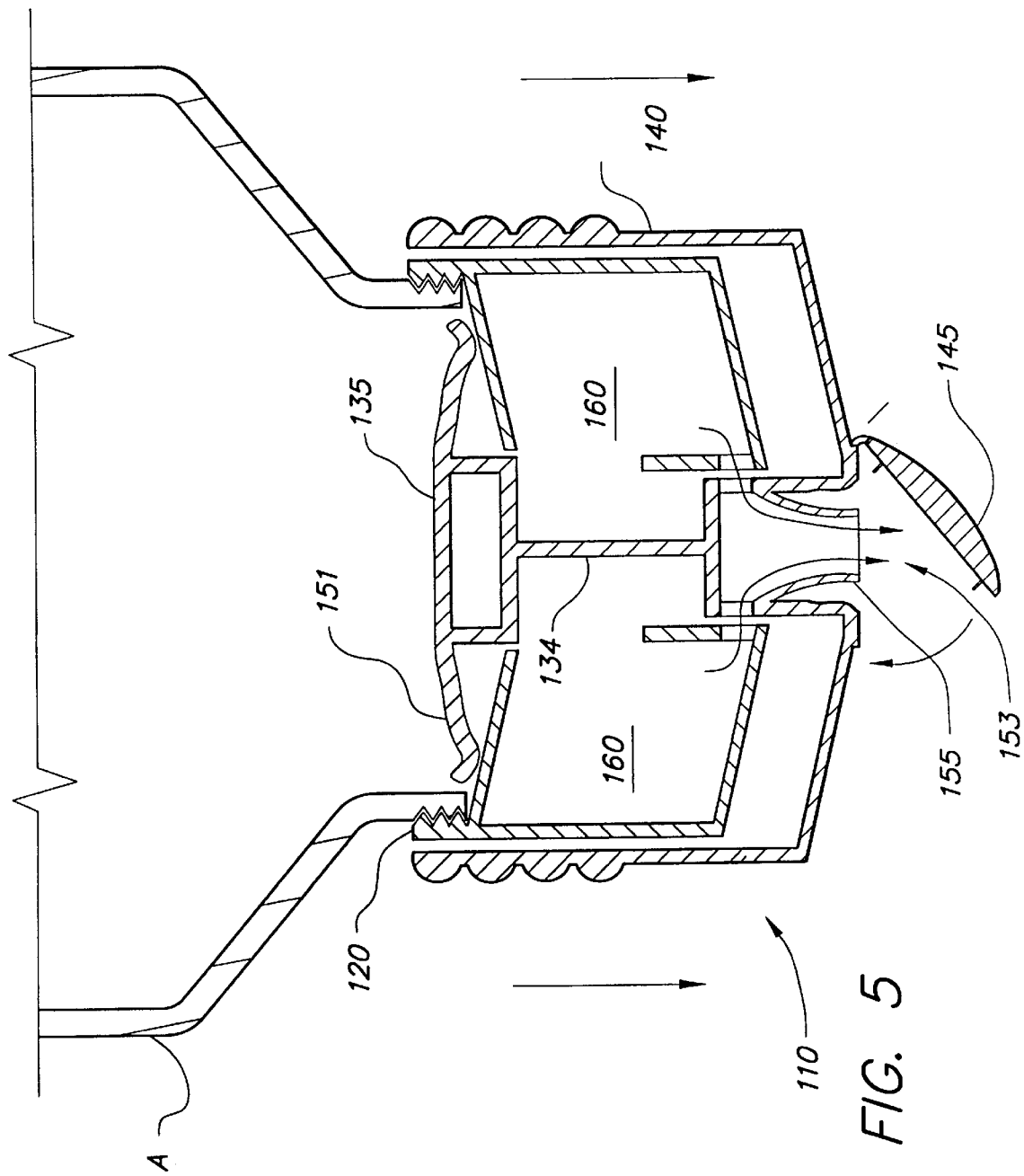
FIG. 5 is a cross sectional view in a vertical plane passing through the longitudinal axis of the premeasured dispensing bottle cap of FIG. 4 showing the cap in a dispensing position.
Figure 6:
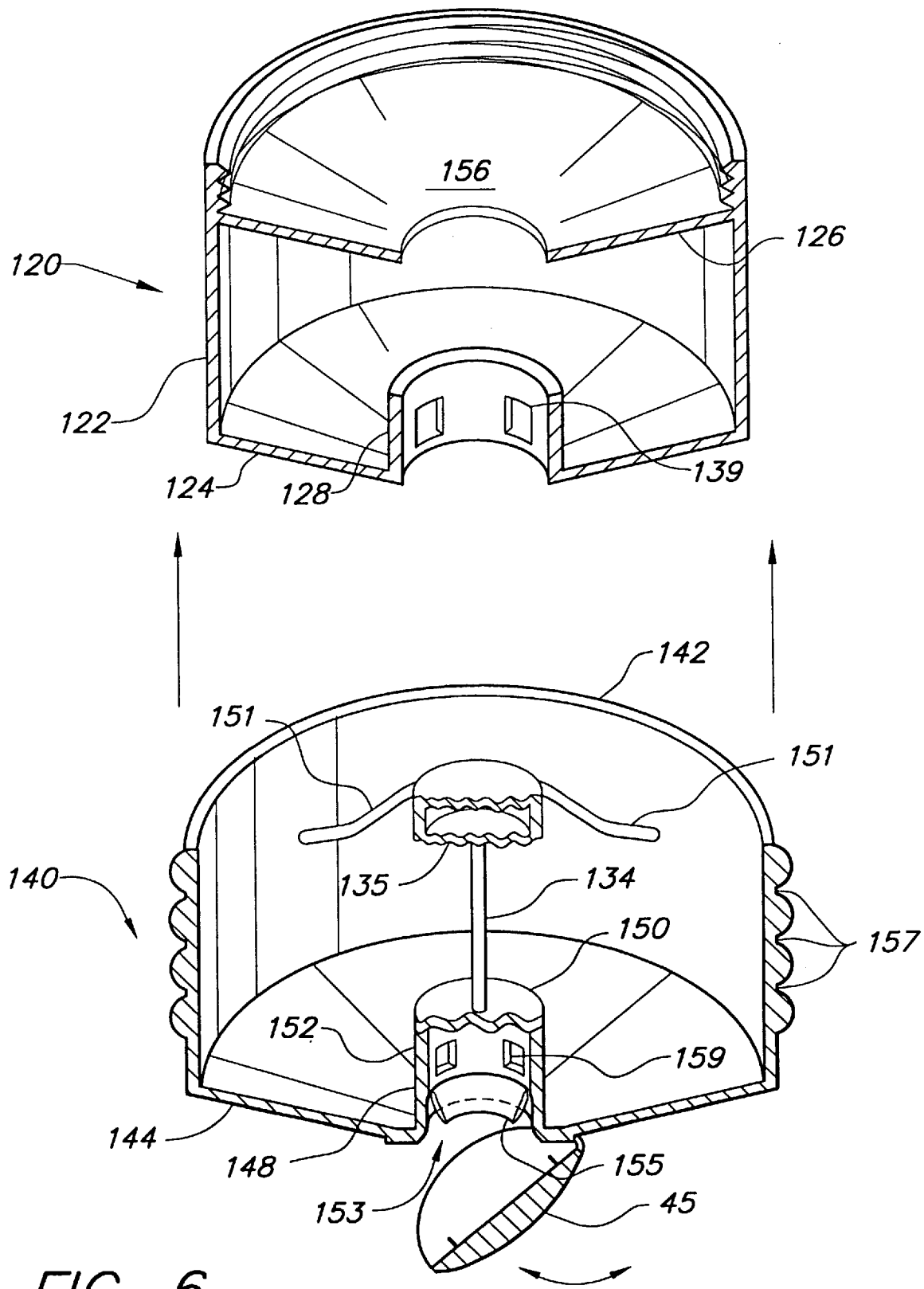
FIG. 6 is an exploded view of the premeasured dispensing bottle cap of FIG. 4 showing the outer sleeve and the inner sleeve.

FIGS. 4 through 6 show a second embodiment of the premeasured dispensing bottle cap according to the present invention. The cap, denoted generally as 110, includes an inner sleeve 120 and an outer sleeve 140. The inner sleeve 120 has an outer wall 122 which is generally cylindrical in shape, the cylinder being hollow and open at one end. The inner sleeve 120 includes a base wall 124 at the base of the outer wall 122, and an interior wall 126, the base wall 124 and the interior wall 126 being perpendicular to the longitudinal axis of the inner sleeve 120.

The inner sleeve 120 includes a center tube 123, the center tube 128 being hollow and generally cylindrical in shape, coaxial with the inner sleeve 120 and open at both ends, defining a circular opening in the base wall 124 of the inner sleeve 120. The center tube 128 has a plurality of ports 139 defined therein for the passage of fluid.

The portion of the outer wall 122 disposed between the interior wall 126 and the top end of the inner sleeve 120 is adapted for connection to the neck or mouth of a bottle A, as shown in FIGS. 4 and 5.

The outer sleeve 140 has an outer wall 142 which is generally cylindrical in shape, the cylinder being hollow. The inside diameter of the outer wall 142 of the outer sleeve 140 is slightly greater than the outside diameter of the outer wall 122 of the inner sleeve 120, so that the outer sleeve 140 may frictionally engage the inner sleeve 120 in slidable relation. The outer sleeve 140 includes a base wall 144 at the base of the outer wall 142 perpendicular to the longitudinal axis of the outer sleeve 140.

The outer sleeve 140 includes a hollow, cylindrical center tube 148 having a top wall 150 and a skirt 152, the skirt having a plurality of ports 159 defined therein for the passage of fluids, the center tube 148 being open at one end. The skirt 152 defines a dispenser opening 153 in the base wall 144 at the open end of the center tube 148. A spout 155 shaped like the frustrum of a cone and open at both ends depends from the interior walls of the skirt 152 and extends into the dispensing outlet 153. The center tube 148 is coaxial with the longitudinal axis of the outer sleeve 140.

The base wall 144 has a cover 145 hingedly attached thereto aligned with the dispensing outlet 153 in order to prevent the dispensing of liquid from the bottle A when the cover 145 is in the closed position. The outer sleeve 140 also may have some form of gripping means on its outside surface, such as a plurality of grooves 157 defined therein either horizontally or vertically, to provide a surface which is easier to grasp when sliding the sleeve 140.

A rod 134 is mounted above the top wall 130, the rod 134 being attached to a cylindrically shaped valve 135. The interior wall 126 of the inner sleeve 120 has a circular opening defined therein having a diameter slightly greater than the outer diameter of the valve 135 in order to form a valve seat 156 frictionally engaged by the valve 135. The length of the rod 134 is such that, with the bottle in an inverted position, the rod 134 extends through the valve seat 156, the valve 135 being disposed above the interior wall 126 with the outer sleeve 140 in a retracted position, as shown in FIG. 4, and engages the valve seat 156 with the outer sleeve 140 in an extended position as shown in FIG. 5. A pair of leaf springs 151 are attached to the outer circumference of the valve 135 about 180° apart, the ends of the leaf springs resting upon the top surface of the interior wall 126. The springs 151 operate to normally bias the outer sleeve 140 in a retracted position, opening the valve 135.

Operation of the second embodiment of the cap 110 is similar to operation of the first embodiment. The outer sleeve 140 is in sliding relation with the inner sleeve 120, having a dispensing position with the outer sleeve 140 extended, and a fill position with the outer sleeve 140 retracted. In the fill position, the outer wall 122, base wall 124, and interior wall 126 of the inner sleeve 120 define a measuring chamber 160. With the bottle A inverted, the valve 135 is biased open by the springs 151, permitting liquid to flow into the measuring chamber 160. The center tube 148 of the outer sleeve is retracted so that the walls of the center tube 148 block the passage of fluid through the ports 139 in the inner sleeve 120, sealing the bottom of the chamber 160, as shown in FIG. 4.

The outer sleeve 140 may then be extended to the dispensing position, as shown in FIG. 5. In the dispensing position, the valve 135 engages the valve seat 156, sealing the top of the measuring chamber 160, preventing the further flow of liquid from the bottle A to the chamber 160. The ports 139 and 159 are registered, permitting the flow of liquid by gravity with the bottle A inverted from the measuring chamber 160 through the ports 139 and 159 defined in the inner sleeve 120 and the outer sleeve 140, exiting the cap 110 through spout 155 in the dispensing outlet 153, the hinged cover 145 being open. The same modifications discussed for the first embodiment of the cap 10 are applicable to the second embodiment of the cap 110.

The first two embodiments operate by slidable engagement of the outer sleeve and inner sleeve. By contrast, the third and fourth embodiments operate by rotating engagement of the outer sleeve and inner sleeve. The third and fourth embodiments are shown in FIGS. 7 through 12.

Both embodiments of the cap, designated generally as 210, have an inner sleeve 220 and an outer sleeve 240. The inner sleeve 220 has an outer wall 222 which is generally cylindrical in shape, the cylinder being hollow and open at one end. The inner sleeve 220 includes a base wall 224 at the base of the outer wall 222, and an interior wall 226, the base wall 224 and the interior wall 226 being perpendicular to the longitudinal axis of the inner sleeve 220.

Figure 9:
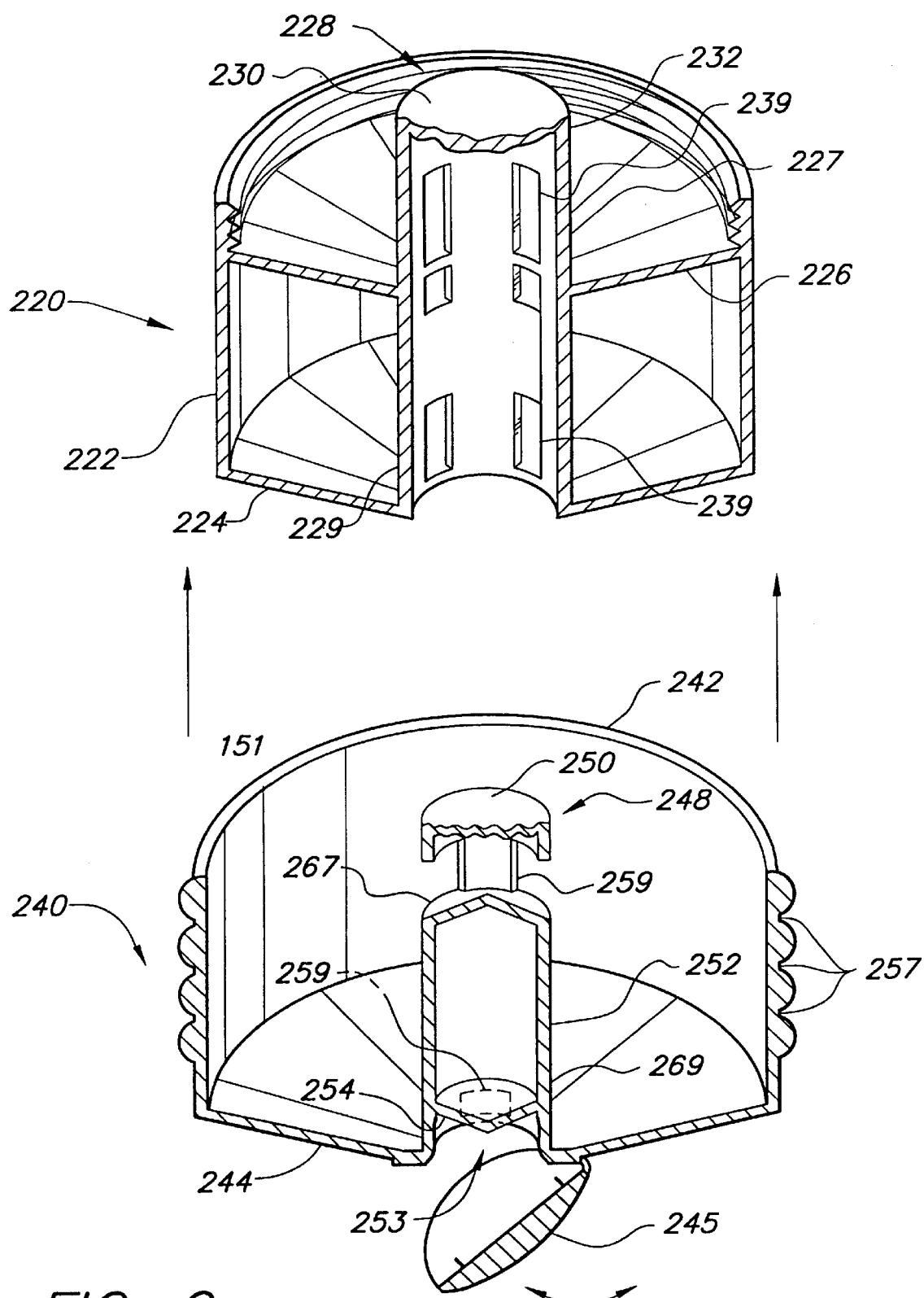
FIG. 9 is an exploded view of the premeasured dispensing bottle cap of FIG. 7 showing the outer sleeve and the inner sleeve.
Figure 12:
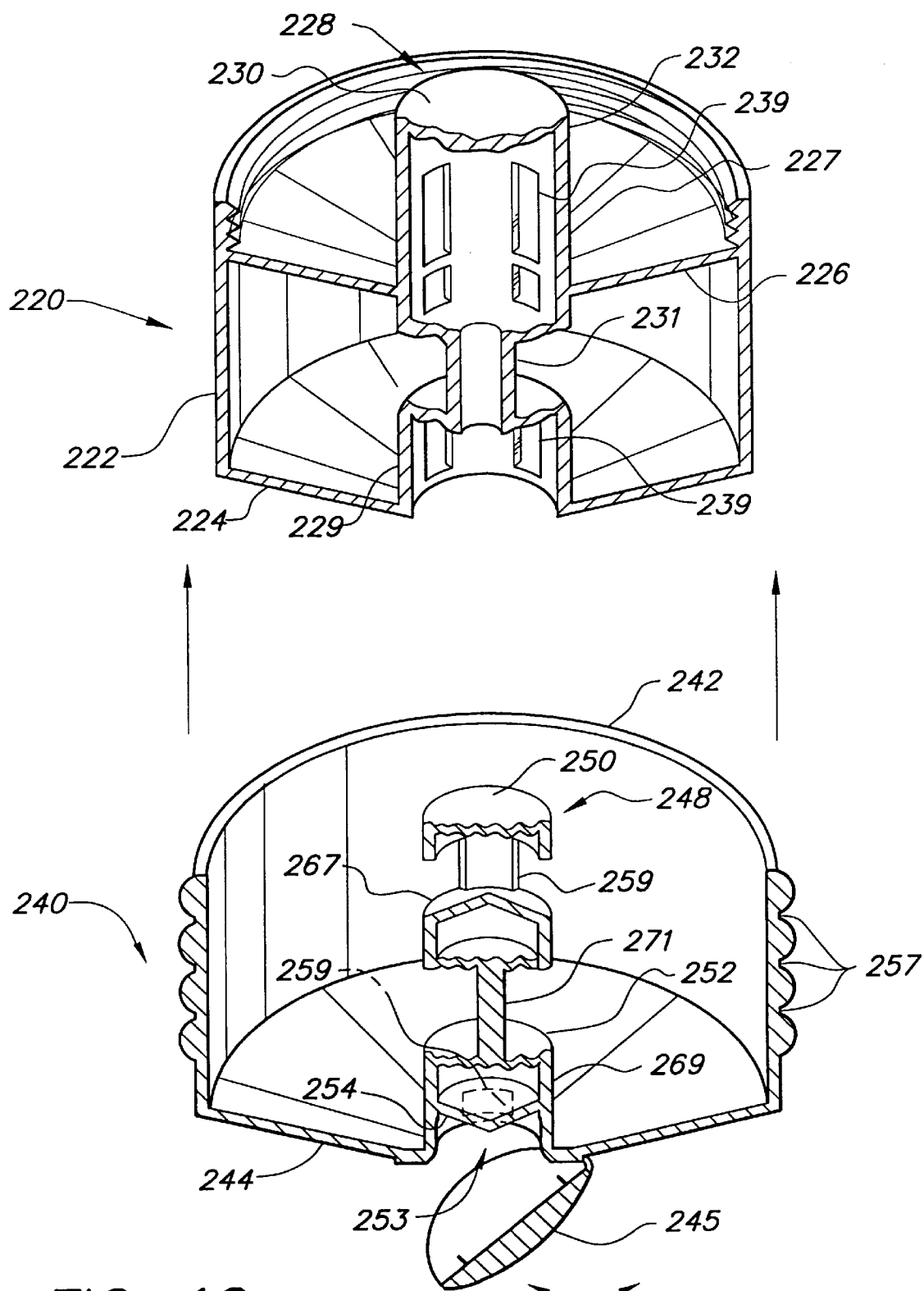
FIG. 12 is an exploded view of the premeasured dispensing bottle cap of FIG. 10 showing the outer sleeve and the inner sleeve.

The inner sleeve 220 includes a center tube 223, having a top wall 230 and a skirt 232. The center tube 228 is hollow and generally cylindrical in shape, coaxial with the inner sleeve 220, and open at the bottom, the skirt 232 defining a circular opening in the base wall 224 of the inner sleeve 220. The center tube 228 has a height greater than the height of the outer wall 222 and extends through the interior wall 226. In the third embodiment, as shown in FIG. 9, the cylindrical center tube 228 extends from the top wall 230 to the base wall 224 with uniform diameter throughout its length. In the fourth embodiment, as shown in FIG. 12, the center tube 228 is divided into a top section 227 and a bottom section 229 joined by a center section 231 of smaller diameter than the top and bottom sections of the center tube 228, the center section 231 being disposed between the base wall 224 and the interior wall 226.

The portion of the outer wall 222 disposed between the interior wall 226 and the open end of the inner sleeve 220 is adapted for connection to the neck or mouth of a bottle A, as shown in FIGS. 7, 8, 10 and 11. The skirt 232 has a plurality of ports 239 spaced 180° apart for the passage of fluid defined therein, both above and below the level of the interior wall 226 and in the top section 227 and the bottom section 229 of the center tube 228.

The outer sleeve 240 has an outer wall 242 which is generally cylindrical in shape, the cylinder being hollow and open at one end. The inside diameter of the outer wall 242 of the outer sleeve 240 is slightly greater than the outside diameter of the outer wall 222 of the inner sleeve 220, so that the outer sleeve 240 may frictionally engage the inner sleeve 220 in rotating relation. The outer sleeve 240 includes a base wall 244 at the base of the outer wall 242 perpendicular to the longitudinal axis of the outer sleeve 240.

The outer sleeve includes a center tube 248, having a top wall 250 and a skirt 252. The center tube 248 is hollow and generally cylindrical in shape, coaxial with the outer sleeve 240, and open at the bottom, the skirt 252 defining a circular dispenser opening or outlet 253 in the base wall 244 of the outer sleeve 240. The center tube 248 has a height greater than the height of the outer wall 244. In the third embodiment, as shown in FIG. 9, the cylindrical center tube 248 extends from the top wall 250 to the base wall 244 with uniform diameter throughout its length. In the fourth embodiment, as shown in FIG. 12, the center tube 248 is divided into a top section 267 and a bottom section 269 joined by a rod 271 of smaller diameter than the top 267 and bottom 269 sections of the center tube 248. The inner diameter of the center section 231 of the center tube 228 of the inner sleeve 220 is slightly greater that the outer diameter of the rod 271 so that the rod 271 is freely rotatable within the center section 231. The bottom portion of the center tube 248 contains a V-shaped strut 254 bisecting the tube 228.

The skirt 252 includes a plurality of ports 259 for the passage of fluids spaced 180° apart in both the top 267 and bottom 269 sections of the center tube 248. The base wall 244 has a cover 245 hingedly attached thereto aligned with the dispensing outlet 253 in order to prevent the dispensing of liquid from the bottle A when the cover 245 is in the closed position. The outer sleeve 240 also may have some form of gripping means on its outside surface, such as a plurality of grooves 257 defined wherein either horizontally or vertically, to provide a surface which is easier to grasp when sliding the sleeve 240. The ports 239 and 259 defined in the top sections 227 and 267 of the inner 220 and outer 240 sleeves are aligned 900 out of phase with the ports 239 and 259 defined in the bottoms sections 229 and 269 of the inner 220 and outer 240 sleeves, so that when the ports 239 and 259 in the upper sections 227 and 267 are registered to permit the passage of fluids, the ports 239 and 259 in the bottom sections 229 and 269 are blocked to prevent the flow of fluids, and vice versa.

Figure 7:
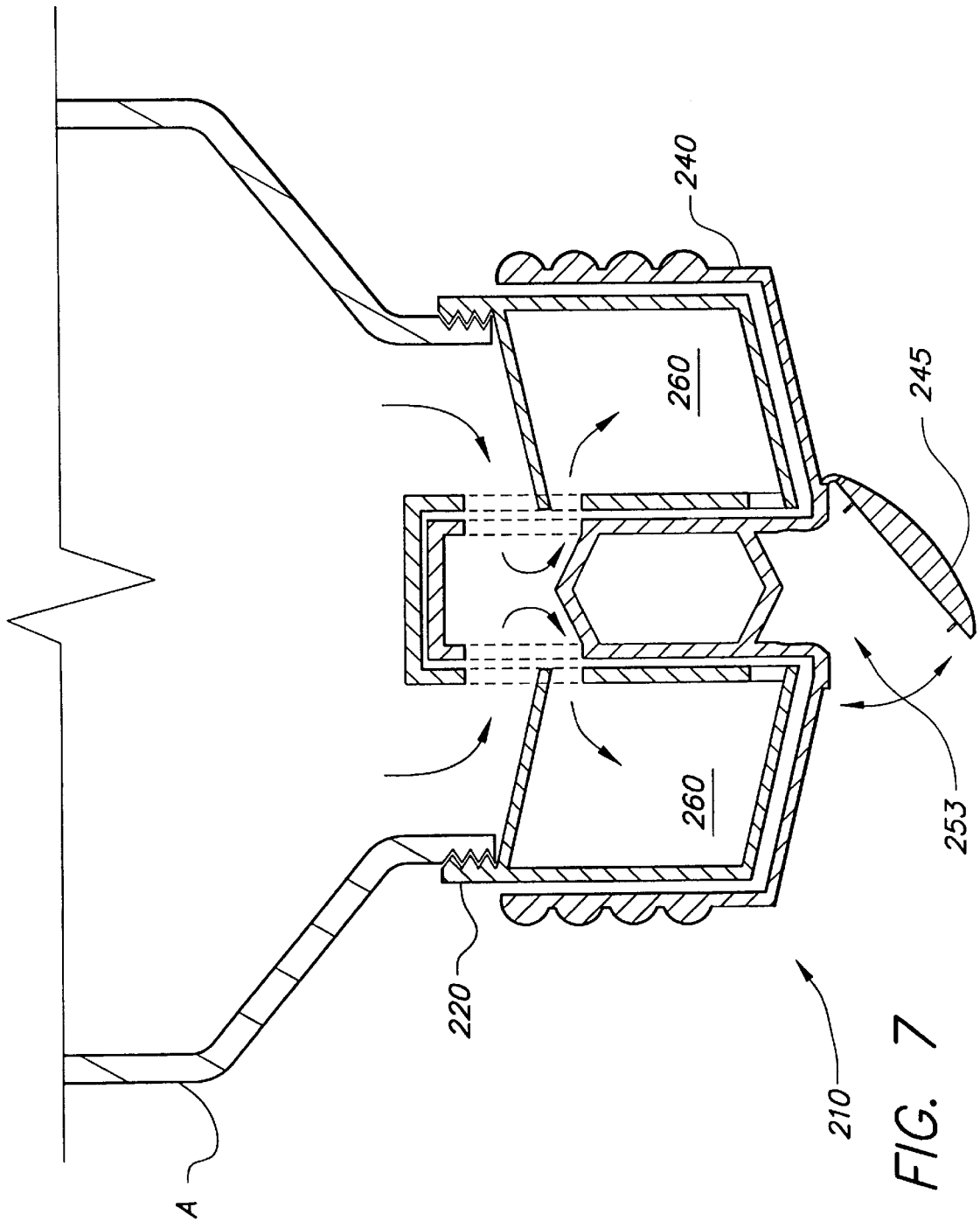
FIG. 7 is a cross sectional view in a vertical plane passing through the longitudinal axis of a third embodiment of a premeasured dispensing bottle cap according to the present invention showing the cap in a fill position.
Figure 10:
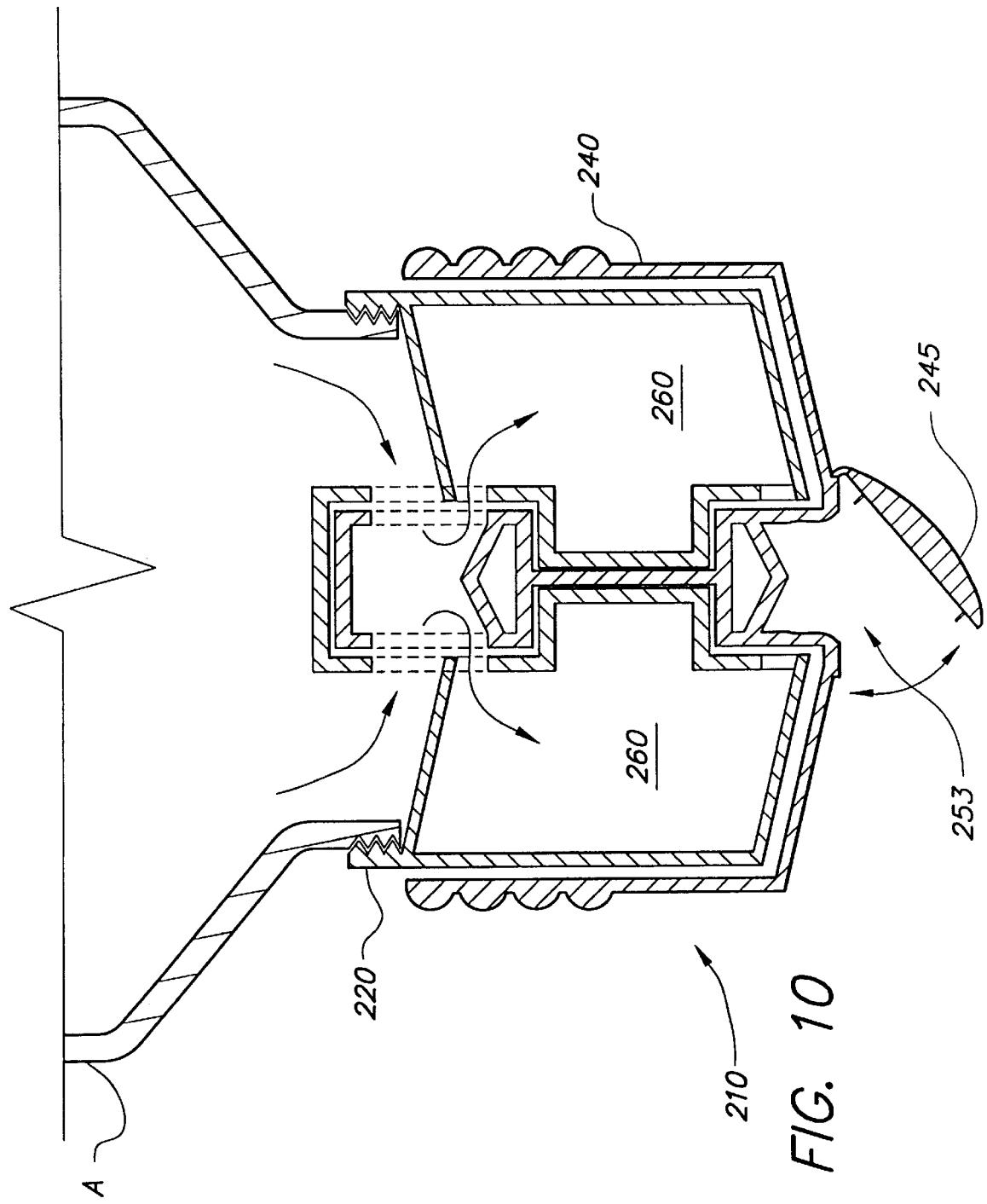
FIG. 10 is a cross sectional view in a vertical plane passing through the longitudinal axis of a fourth embodiment of a premeasured dispensing bottle cap according to the present invention showing the cap in a fill position.

The third and fourth embodiments are identical in operation. The outer sleeve 240 is in rotating relation with the inner sleeve 220, having a dispensing position, and a fill position. In the fill position, the outer wall 222, base wall 224, and interior wall 226 of the inner sleeve 220 define a measuring chamber 260. The skirt 252 of the center tube 248 blocks the ports 239 defined in the bottom section 229 of the inner sleeve 220, sealing the bottom of the chamber 260 in order to prevent liquid from being dispensed. At the same time, the ports 239 and 259 in the upper sections 227 and 267 are registered, permitting a measured volume of liquid to fill the chamber 260 when the bottle A is inverted, as shown in FIGS. 7 and 10.

Figure 8:
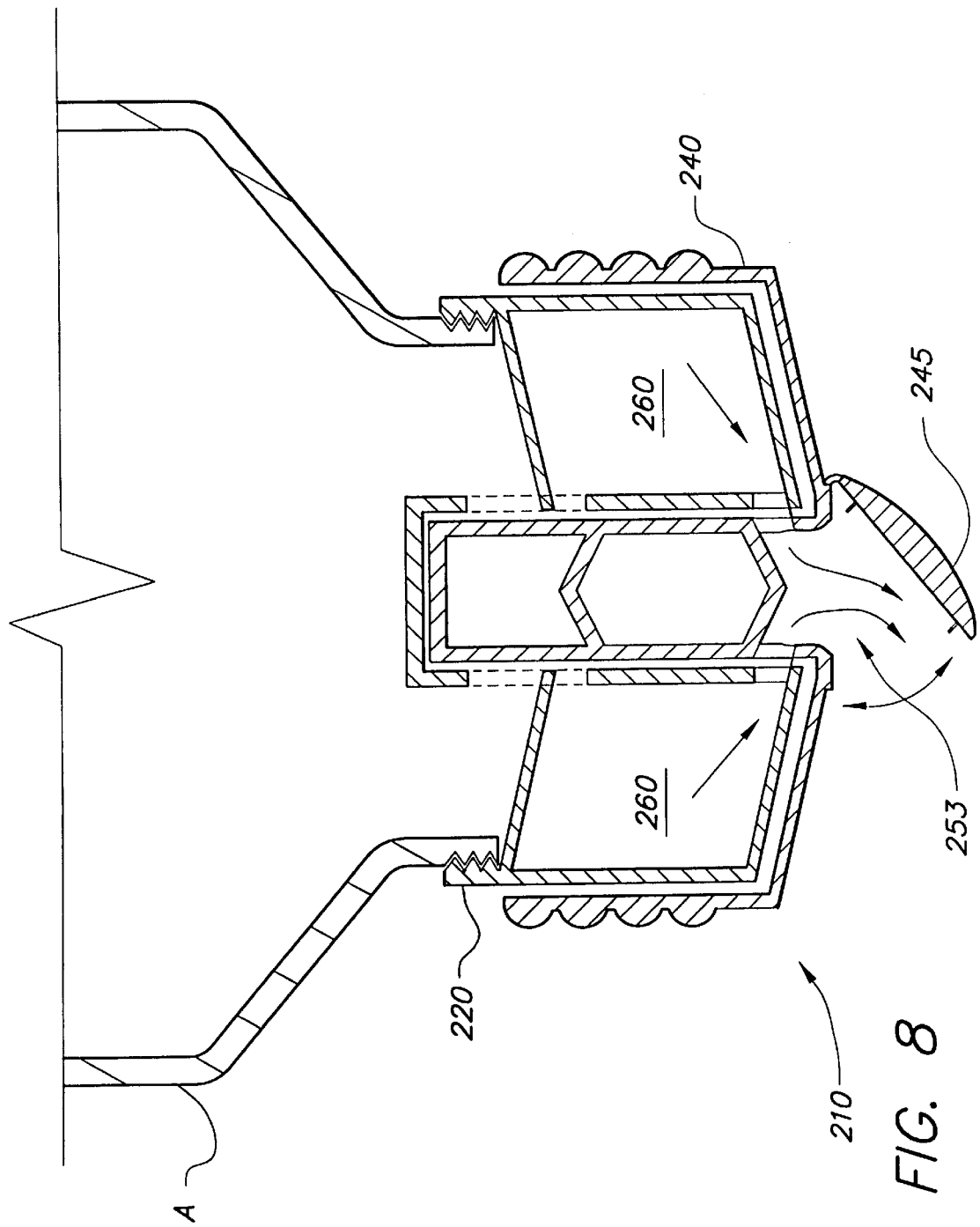
FIG. 8 is a cross sectional view in a vertical plane passing through the longitudinal axis of the premeasured dispensing bottle cap of FIG. 7 showing the cap in a dispensing position.
Figure 11:
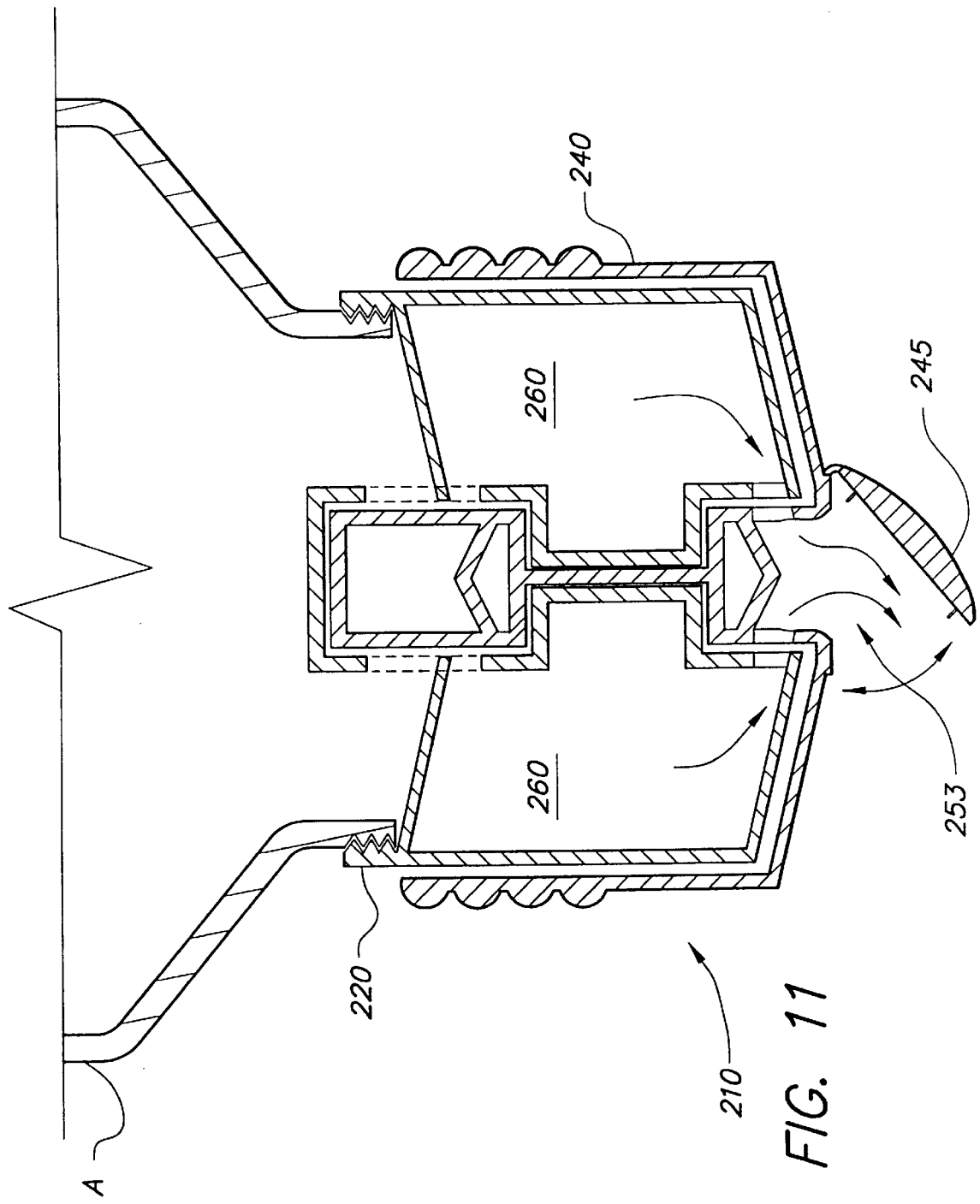
FIG. 11 is a cross sectional view in a vertical plane passing through the longitudinal axis of the premeasured dispensing bottle cap of FIG. 10 showing the cap in a dispensing position.

The outer sleeve may then be rotated 90° to the dispensing position, as shown in FIGS. 8 and 11. In the dispensing position, the skirt 52 blocks the ports 239 defined in the top section 227 of the inner sleeve 220, sealing the top of the measuring chamber 260, preventing the further flow of liquid from the bottle A to the chamber 260. At the same time, the ports 239 and 259 in the bottom sections 229 and 269 are registered, permitting the flow of liquid by gravity with the bottle A inverted from the measuring chamber 260 through the ports 239 and 259 defined in the inner sleeve 220 and the outer sleeve 240, exiting the cap 210 through the dispensing outlet 253, the hinged cover 245 being open.

The third and fourth embodiments operate identically. With the bottle A inverted and the outer sleeve in the fill position, the ports 239 and 259 in the top sections 227 and 267 of the inner 220 and outer 240 sleeves are registered to permit the flow of liquid from the bottle A into the measuring chamber 260 up to a predetermined volume, as shown in FIGS. 7 and 10. At the same time, the ports 239 and 259 in the bottom sections 229 and 269 of the inner and outer sleeves are out of register, blocking the flow of liquid to the dispensing outlet 253. With the measuring chamber 260 now full, the outer sleeve 240 is rotated one quarter turn to the dispensing position, as shown in FIGS. 8 and 11. The ports 239 and 259 in the top sections 227 and 267 are now out of register, blocking the flow of liquid from the bottle A to the measuring chamber 260, but the ports 239 and 259 in the bottom sections 227 and 267 in the inner 220 and outer 240 sleeves are now registered, permitting the flow of a premeasured volume of liquid from the measuring chamber 260 through the dispensing outlet 253.

The four embodiments of the present invention may be easily and economically fabricated from a thermoplastic material.

It is to be understood that the present invention is not limited to the sole embodiments described above, but encompasses any and all embodiments within the scope of the following claims.

We claim:

1. A premeasured dispensing bottle cap for dispensing a predetermined volume of liquid from a bottle when the bottle is inverted, comprising:
   a cylindrical inner sleeve adapted for engaging the neck of the bottle and a cylindrical outer sleeve slidably engaging the inner sleeve;
   a) said inner sleeve having,
      i) an outer wall;
      ii) a base wall;
      iii) an interior wall, wherein the outer wall, base wall and interior walls defining a chamber having a predetermined volume; and iv) a cylindrical center tube having a plurality of ports defined therein for the passage of liquids, the center tube being coaxial with the outer wall of said inner sleeve;

b) said outer sleeve having, i) an outer wall having gripping means for improving a user's grasp on the sleeve in order to slide the outer sleeve with respect to said inner sleeve;

ii) a base wall having a dispensing outlet defined therein;

iii) a cover hingedly attached to said base wall; and iv) a cylindrical center tube having a plurality of ports defined therein, the center tube being coaxial with the outer wall of said outer sleeve; and c) valve means for controlling the flow of liquid so that liquid flows through the ports defined said inner sleeve and said outer sleeve in order to fill said measuring chamber with a predetermined volume of liquid while blocking the flow of liquid through the dispenser outlet when said outer sleeve is in a fill position, and so that liquid flows from said measuring chamber through the ports defined in said inner sleeve and said outer sleeve and through said dispensing outlet while the flow of liquid from the bottle to said measuring chamber is blocked when said outer sleeve is in a dispensing position, the outer sleeve being retracted in the fill position and extended in the dispensing position.

2. The premeasured dispensing bottle cap according to claim 1, wherein:

a) the center tube of said inner sleeve further comprises, i) a top wall, the center tube extending through the interior wall of said inner sleeve so that the top wall is adapted for being disposed in the neck of the bottle; and ii) a rod coaxial with the outer wall of said inner sleeve depending from said top wall; and b) said valve means comprises, i) a top valve disposed about the circumference of said rod;

ii) a top valve seat projecting inwardly from the center tube of said outer sleeve, said top valve being adapted for engaging the top valve seat in order to prevent the flow of liquid from the bottle into said measuring chamber when said outer sleeve is in a dispensing position;

iii) a bottom valve disposed about the circumference of said rod; and iv) a bottom valve seat projecting inwardly from the center tube of said outer sleeve, said bottom valve being adapted for engaging the bottom valve seat in order to prevent the flow of liquid from said measuring chamber through the dispenser outlet when said outer sleeve is in a fill position.

3. The premeasured dispensing bottle cap according to claim 1, wherein:

a) the interior wall of said inner sleeve has a hole defined therein comprising a valve seat;

b) the center tube of said outer sleeve further includes, i) a top wall;

ii) a rod attached to the top wall of the center tube of said outer sleeve and coaxial with the outer wall of said center sleeve, the rod extending through the said valve seat; and iii) a spout depending from the center tube of said outer sleeve into said dispensing outlet; and c) said valve means further comprising, i) a valve attached to the end of said rod opposite the top wall of the center tube of said outer sleeve, the valve being adapted for engaging said valve seat when the outer sleeve is in a dispensing position in order to prevent liquid from flowing from the bottle into said measuring chamber;

ii) a pair of leaf springs attached to said valve and extending between said valve and the interior wall of said inner sleeve for biasing said valve in a normally open position, whereby liquid may flow from said bottle through the valve seat into said measuring chamber, with said outer sleeve being in the fill position; and iii) wherein the ports defined in said outer sleeve are registered with the ports defined in said inner sleeve in order to permit liquid to flow from said measuring chamber through said spout and said dispensing outlet when said outer sleeve is in a dispensing position, and are out of register to prevent the flow of fluid from said measuring chamber through said dispensing outlet when said outer sleeve is in the fill position.

4. A premeasured dispensing bottle cap for dispensing a predetermined volume of liquid from a bottle when the bottle is inverted, comprising:

a cylindrical inner sleeve adapted for engaging the neck of the bottle and a cylindrical outer sleeve in rotating engagement with the inner sleeve, a) said inner sleeve having, i) an outer wall;

ii) a base wall;

iii) an interior wall, the outer wall, base wall and interior walls defining a chamber having a predetermined volume; and iv) a cylindrical center tube having a top section and a bottom section, the top and bottom sections each having a plurality of ports defined therein for the passage of liquids, the center tube being coaxial with the outer wall of said inner sleeve and extending through said interior wall, being adapted to extend into the neck of the bottle;

b) said outer sleeve having, i) an outer wall having gripping means for improving a user's grasp on the sleeve in order to rotate the outer sleeve with respect to said inner sleeve;

ii) a base wall having a dispensing outlet defined therein;

iii) a cover hingedly attached to said base wall; and iv) a cylindrical center tube having a top section and a bottom section, the top and bottom sections each having a plurality of ports defined therein, the center tube being coaxial with the outer wall of said outer sleeve; and c) wherein the ports defined in the top section of said inner sleeve and the top section of said outer sleeve are aligned 90° out of phase with the ports defined in the bottom section of said inner sleeve and the bottom section of said outer sleeve, whereby said cap has a fill position in which the ports in the top sections of said inner sleeve and said outer sleeve are registered, being adapted for permitting the flow of fluid from the bottle to the measuring chamber while the ports in the bottom sections of said inner sleeve and said outer sleeve are out of register, being adapted for blocking the flow of liquid, and whereby said cap has a dispensing position in which the ports in the bottom sections of said inner sleeve and said outer sleeve are registered, being adapted for permitting the flow of fluid from said measuring chamber through said dispensing outlet while the ports in the top sections of said inner sleeve and said outer sleeve are out of register, being adapted for blocking the flow of liquid.

5. The premeasured dispensing bottle cap according to claim 4, wherein:

a) the center tube of said inner sleeve further comprises a center section disposed between the top section and bottom sections of said inner sleeve, the center section being a hollow tube having a smaller diameter than the top and bottom sections of the center tube of said inner sleeve; and b) the center tube of said outer sleeve further comprises a rod disposed between the top and bottom sections of the center tube of said outer sleeve, the outside diameter of the rod being slightly smaller than the inside diameter of the center section of the center tube of said inner sleeve, whereby the rod is freely rotatable with the center section of the center tube of said inner sleeve.

* * * * *